United States Patent [19]

Fitch et al.

[11] 4,373,585
[45] Feb. 15, 1983

[54] METHOD OF SOLVENT FLOODING TO RECOVER VISCOUS OILS

[75] Inventors: John L. Fitch, Dallas; Lynn D. Mullins, De Soto, both of Tex.

[73] Assignee: Mobil Oil Corporation, New York, N.Y.

[21] Appl. No.: 285,696

[22] Filed: Jul. 21, 1981

[51] Int. Cl.³ .......................................... E21B 43/22
[52] U.S. Cl. .................................. 166/263; 166/271; 166/274
[58] Field of Search ................ 166/263, 271-274

[56] References Cited

U.S. PATENT DOCUMENTS

| | | | |
|---|---|---|---|
| 2,897,894 | 8/1959 | Draper et al. | 166/272 |
| 3,245,467 | 4/1966 | Fitch | 166/273 |
| 3,500,916 | 3/1970 | Van der Knapp et al. | 166/272 |
| 3,500,917 | 3/1970 | Lehner et al. | 166/272 |
| 3,771,598 | 11/1973 | McBean | 166/272 X |
| 3,838,738 | 10/1974 | Redford et al. | 166/272 X |
| 3,997,004 | 12/1976 | Wu | 166/272 X |
| 4,026,358 | 5/1977 | Allen | 166/263 X |
| 4,127,170 | 11/1978 | Redford | 166/272 X |
| 4,241,790 | 12/1980 | Magnie | 166/263 X |
| 4,293,035 | 10/1981 | Fitch | 166/273 |

*Primary Examiner*—Stephen J. Novosad
*Assistant Examiner*—George A. Suchfield
*Attorney, Agent, or Firm*—Charles A. Huggett; James F. Powers, Jr.; Lawrence O. Miller

[57] ABSTRACT

Oil may be recovered from viscous oil-containing formations including tar sand deposits by first establishing a fluid communication path in the lower portion of the formation intermediate at least one injection well and a production well. A hydrocarbon solvent having a density less than oil contained in the formation and a viscosity not greater than 1/100 the viscosity of the oil contained in the formation under formation conditions is injected into the communication path and fluids including oil are recovered from the production well until the fluid recovered contains an unfavorable ratio of oil to solvent. The production well is shut-in and an additional quantity of the hydrocarbon solvent is injected into the fluid communication path, preferably until a total amount of between 0.05 to 0.30 pore volume. The injection well is then shut-in along with the production well to permit the formation to undergo a soak period for a variable time, preferably for a time of between 2 to 20 days per vertical thickness in feet of oil-containing formation. A driving fluid such as water is then injected into the formation via the injection well and the oil is produced until there is an unfavorable ratio of oil to driving fluid. During the fluid drive recovery phase, the injection well and production well may be completed to be in fluid communication with the entire portion of the formation to obtain a more uniform displacement of the upgraded formation oil by the driving fluid.

27 Claims, 1 Drawing Figure

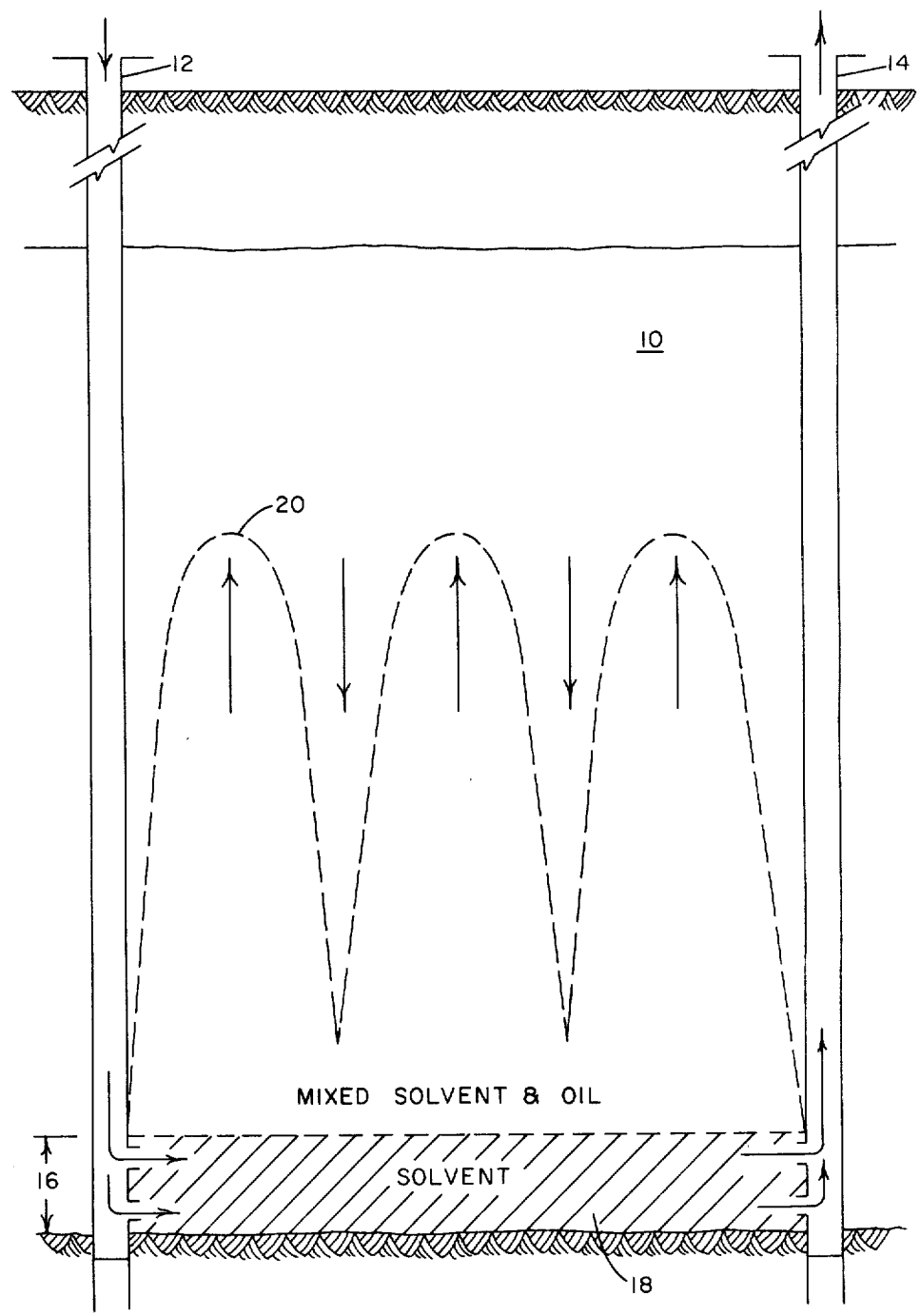

METHOD OF SOLVENT FLOODING TO RECOVER VISCOUS OILS

BACKGROUND OF THE INVENTION

1. Field of the Invention

This invention is directed to a method of recovering oil from viscous oil-containing subsurface formations. More particularly, this invention is directed to a hydrocarbon solvent recovery method for recovering oil from subsurface formations that are penetrated by at least one injection well and one production well which extend from the surface of the earth and into the subsurface formation containing viscous hydrocarbons.

2. Description of the Prior Art

In copending application Ser. No. 46,275, now U.S. Pat. No. 4,293,034 filed June 7, 1979, to John L. Fitch, there is disclosed a method of recovering viscous oil from a viscous oil-bearing subsurface formation wherein a solvent is injected into a high mobility channel formed in the bottom of the formation intermediate an injection well and a production well. The solvent is injected until the ratio of produced oil to solvent becomes unfavorable and thereafter the injection of solvent is terminated and gas is injected into the high mobility channel to produce solvent and oil from the formation.

In U.S. Pat. No. 3,838,738 there is described a method for recovering viscous petroleum from petroleum-containing formations by first establishing a fluid communication path low in the formation. A heated fluid is then injected into the fluid communication path followed by injecting a volatile solvent such as carbon disulfide, benzene or toluene into the preheated flow path and continuing injecting the heating fluid and recovering fluids including petroleum from the production on well.

In U.S. Pat. No. 3,500,917 there is disclosed a method for recovering crude oil from an oil-bearing formation having a water-saturated zone underlying the oil-saturated zone. A mixture of an aqueous fluid which has a density greater than the density of the crude oil and a solvent having a density less than the density of the crude oil are injected into the water-saturated zone and oil is produced from the formation.

U.S. Pat. No. 4,026,358 discloses a method for recovering heavy oil from a subterranean hydrocarbon-bearing formation traversed by at least one injection well and one production well wherein a slug of hydrocarbon solvent in amounts of 0.1 to about 20 percent of the formation pure volume and having a gas dissolved therein is injected into the formation via the injection well. Thereafter, a thermal sink is created in the formation by in-situ combustion or by injecting steam. The wells are then shut-in for a predetermined time to permit the formation to undergo a soak period, after which production is continued. Optionally, after the production period, the formation may be water flooded to recover additional oil from the formation.

SUMMARY OF THE INVENTION

This invention is directed to a method of recovering viscous oil from a viscous oil-containing formation that has no significant vertical permeability barrier in the portion of the formation to be tested and which is penetrated by at least one injection well and one production well. A fluid communication path is established through the lower portion of the subsurface formation intermediate the injection well and the production well, and a hydrocarbon solvent for the viscous oil having a viscosity not greater than 1/100 the viscosity of the oil contained in the formation under formation conditions and a specific gravity less than the oil contained in the formation, is injected via the injection well into this path and fluids including oil are recovered from the production well until the produced fluid contains an unfavorable ratio of oil to solvent. When this occurs, the production well is shut-in and an additional quantity of hydrocarbon solvent, liquid under formation conditions, is injected into the formation via the injection well and through the fluid communication path, preferably until a total amount within the range of 0.05 to 0.30 pore volume has been injected. Thereafter, the injection well is shut-in along with the shut-in production well to permit the formation to undergo a soak period for a variable time, preferably for a period of time between 2 to 20 days per vertical thickness in feet of the viscous oil-containing formation. During this soak period, the light hydro-carbon solvent will tend to rise and the heavy oil will move downward in a gravity-driven convection process forming a pattern of fingers. This fingering causes a more effective contact between the oil and solvent thus providing a greater volume of oil that is reduced in viscosity and which can be produced more readily. Thereafter, a driving fluid such as water is injected into the injection well to displace the mixture of oil and solvent toward the production well for recovery. Production is continued until the fluid including oil recovered from the production well contains an unfavorable ratio of oil to driving fluid.

BRIEF DESCRIPTION OF THE DRAWING

The drawing represents a cross-sectional view of a subsurface oil-containing formation with the improved solvent recovery method depicted therein.

DESCRIPTION OF THE PREFERRED EMBODIMENTS

This invention relates to a hydrocarbon solvent recovery method for recovering viscous oil from a viscous oil-containing subsurface formation that has no significant vertical permeability barrier in the portion of the formation to be treated. More particularly, this invention relates to a gravity convection technique for recovering viscous oil in combination with a production drive process.

Viscous oil is a term used to identify oil having relatively high viscosity and includes those oils referred to as tars. Such viscous oils are also referred to as heavy oils. In general, the term viscous oil is used to include those heavy oils and tars such as are commonly found in formations referred to as heavy oil or tar sands that have viscosities that are great enough to severely restrict the production of the oils from the formations in which they are found. The API gravity of such viscous oils is normally 20° API or less.

Referring to the drawing, a viscous oil-bearing formation 10 that has no significant vertical permeability barriers is penetrated by an injection wall 12 and a production well 14. The injection well 12 and production well 14 are perforated or fluid flow communication is otherwise established only adjacent the lower portion of the viscous oil-containing formation, and preferably only in the lower 10 percent or less of the formation designated as 16 in the drawing. A fluid communication path 18 is established intermediate the injection and production wells 12 and 14 through the lower portion of the viscous oil-containing formation 10. Thereafter, a hydrocarbon solvent having a specific gravity less than the specific gravity of the oil contained in the formation and having a viscosity not greater than 1/100 of the viscosity of the oil contained in the formation under formation conditions is injected via the injection well 12 through the fluid communication path 18 and fluid including oil is recovered from the formation via production well 14. Solvent injection is continued until the fluid being recovered from the production well 14 comprises an unfavorable ratio of oil to solvent.

Thereafter, production well 14 is shut-in and an additional quantity of hydrocarbon solvent, liquid under formation conditions, is injected into the lower portion of the formation via the injection well 12 through the fluid communication path 18. The total amount of solvent injected is preferably within the range of 0.05 to 0.30 pore volume. Once this amount of solvent has been injected, the injection well 12 is shut-in along with the shut-in production well 14 and the formation is permitted to undergo a soak period for a variable time, preferably for a period of time between 2 to 20 days per vertical thickness in feet of the viscous oil-containing formation. It will be recognized by those skilled in the art of oil recovery that during this shut-in or soak period minor amounts of injection or production fluid, such as for the purpose of testing, may be done without significant detrimental effects on the process. During the soak period, the liquid hydrocarbon solvent being lighter than the oil contained in the viscous oil-containing formation, that is, having a specific gravity less than the specific gravity of the oil contained in the formation and having a viscosity not greater than 1/100 of the viscosity of the oil contained in the formation under formation conditions, will tend to flow by gravity-driven convection upward into the oil-containing formation and the heavy oil will flow by gravity-driven convection downward to form a hydrocarbon solvent-oil convection pattern as shown by the dashed lines 20 in the drawing. Furthermore, because of viscous instabilities, the rising hydrocarbon solvent and descending heavy oil form a pattern of fingers. This fingering is important in that the distribution, size and extension of these fingers will provide intimate contact between the solvent and the heavy oil allowing the two to mix more effectively, thus forming a greater volume of oil that is reduced in viscosity and which can be produced more readily. This relatively low viscosity mixture can be much more effectively displaced from the reservoir than the original heavy oil by flooding the formation with water or other suitable fluid, as is well known to those skilled in the art of petroleum engineering.

Once the soak period has been completed, a driving fluid is injected into the fluid communication path 18 via the injection well 12 and fluid including oil and hydrocarbon solvent is recovered from the production well 14. It is preferred that additional perforations may be added to the injection well 12 or the production well 18, or both if desired, to establish fluid communication in both wells throughout the entire portion of the formation and thus obtain a more uniform displacement of the mobilized reservoir oils by the driving fluid. The driving fluid displaces both the oil and hydrocarbon solvent from the viscous oil-containing formation into the production well 14 and production is continued until the recovered fluid contains an unfavorable ratio of oil to driving fluid. The driving fluid for use in our invention may be gaseous or liquid. For example, gases include light aliphatic hydrocarbons having from one to four carbon atoms; carbon dioxide and nitrogen may be used for the process of our invention. Aqueous fluids are particularly preferred driving fluids in the process of our invention. Water, brine and thickened aqueous fluids are all suitable aqueous fluids for the purpose of our invention.

The fluid communication path 18 through the lower portion of the viscous oil-containing subsurface formation may be formed by injecting a brine having a specific gravity greater than the specific gravity of the oil in the subsurface formation via the injection well 12 and through the perforations therein and into the oil-containing subsurface formation until the brine breaks through at the production well 14. In some formations brine may underlie the oil contained in the subsurface formation. In such cases, an oil-water contact will exist in the formation 10 and no additional brine need to injected into the formation to establish the fluid communication path 18. In such cases, it will be considered that the fluid communication path 18 is established by determining the existence of the oil-water contact and the brine-filled portion of the formation that underlies the oil contained therein and communicates with the injection and the production well.

In the case of an oil-containing formation that is underlain by water and thus has an oil-water contact, the injection well is perforated and the perforation interval is provided adjacent the underlying water. Desirably, the upper perforations of this perforation interval are located about adjacent the oil-water contact though it could extend somewhat above this oil-water contact without seriously affecting the efficiency of the present recovery method. The production well is perforated and the perforation interval is provided adjacent the oil-water contact such that the lower perforation of this interval is located slightly above the oil-water contact. Again, in the case of a formation underlain by water, as it was with the formation that was not underlain by water, the perforation intervals that are provided in the injection and production wells desirably are no longer than about 10 percent of the total thickness of the viscous oil-containing formation.

In the case of a formation underlain by brine which forms a fluid communication path between the injection and production wells, the hydrocarbon solvent is selected to have a specific gravity less than that of the brine in addition to being less than that of the oil contained in the viscous oil-containing formation. The hydrocarbon solvent is injected via the injection well into this brine-filled fluid communication path and the process is continued in the same manner described above for the formation which is not underlain by water.

The hydrocarbon solvents used in our process must have a specific gravity less than that of the oil and less than that of the brine injected or naturally present in the formation and a viscosity not greater than 1/100 the viscosity of the oil contained in the formation under formation conditions. It is also highly desirable that the hydrocarbon solvent remain liquid under the temperature and pressure conditions that exist in the subsurface viscous oil-containing formation and not cause solids such as asphaltenes to precipitate from the oil in amounts sufficient to seriously plug the pores of the formation. The preferred hydrocarbon solvent is a light crude oil. Other examples of suitable hydrocarbon solvents include light oil condensates having an API gravity greater than 30 API degrees and partially refined tar which is generally known as syncrude. It may be desirable to include in the hydrocarbon solvent up to about 10 percent of aromatic material such as aromatic refinery stock to make the solvent compatible with the oil contained in the formations and to prevent the deposition of solid or gelatinous materials such as alphatenes therefrom.

The viscous oil-containing subsurface formation to be treated by the present hydrocarbon solvent recovery method must be one that has no significant vertical permeability barriers in that portion of the formation to be treated. This allows the solvent that is injected into the fluid communication path formed between the injection well and production well to flow upward into the formation by convection forces thus solubilizing the oil and forming a solvent-oil mixture of reduced viscosity that can be more readily produced by a fluid drive process.

The method according to the invention is not restricted to the use in the field in which only two wells penetrate the formation. Any other number of wells, which may be arranged according to any pattern, may be applied in using the present method as illustrated in U.S. Pat. No. 3,927,716 to Burdyn et al. By the term "pore volume" as used herein, is meant that volume of the portion of the formation underlying the well pattern employed, as described in greater detail in the Burdyn et al. patent.

What is claimed is:

1. A method of recovering viscous oil from a viscous oil-containing subsurface formation penetrated by at least one injection well and one production well comprising:
    (a) establishing a fluid communication path extending between the injection well and the production well near the lower portion of said oil-containing formation;
    (b) injecting a hydrocarbon solvent via said injection well into said fluid communication path, said solvent having a specific gravity less than the specific gravity of the oil contained in the formation and a viscosity not greater than 1/100 the viscosity of the oil contained in the formation under formation conditions and recovering fluids including oil and solvent from the fluid communication path via the production well until the fluid comprises an unfavorable ratio of oil to solvent;
    (c) thereafter shutting-in said production well;
    (d) continuing to inject a quantity of said hydrocarbon solvent into the fluid communication path via said injection well;
    (e) shutting in said injection well along with the shut-in production well to permit said formation to undergo a soak period for a time sufficient for gravity-driven convection to substantially mix the solvent with the oil in the formation and thereby reduce its viscosity; and
    (f) thereafter injecting a driving fluid into the formation via said injection well and recovering fluids including oil from said formation via said production well until the fluid being recovered from the production well comprises an unfavorable ratio of produced oil to driving fluid.

2. The method of claim 1 wherein the total amount of solvent injected during steps (b) and (d) is between 0.05 and 0.30 pore volume and the soaking period during step (e) is for a period of time between 2 and 20 days per vertical thickness in feet of the oil-containing formation.

3. The method of claim 1 wherein said fluid communication path is established by injecting a brine having a density greater than the density of said oil into the lower portion of said subsurface formation and continuing to inject said brine until breakthrough at said production well.

4. The method of claim 1 wherein the driving fluid is a gaseous material selected from the group consisting of carbon dioxide, nitrogen or aliphatic hydrocarbons having one to four carbon atoms.

5. The method of claim 1 wherein the driving fluid is water.

6. The method of claim 1 wherein said hydrocarbon solvent is selected from the group consisting of a light crude oil having an API gravity greater than 30 API degrees and a light crude oil product generally known as syncrude.

7. The method of claim 1 comprising the additional step prior to step (f) of establishing fluid communication in the injection well and the production well substantially throughout the full thickness of the oil-containing formation.

8. The method of claim 1 wherein the driving fluid injected during step (f) is injected into the fluid communication path between the injection well and the production well.

9. A method of recovering viscous oil from a viscous oil-containing subsurface formation having no significant vertical permeability barriers therein, said oil formation being penetrated by at least one injection well and a production well comprising:
    (a) establishing a fluid injection means in the injection well between the surface and the lower portion of the oil-containing zone;
    (b) establishing fluid communication between the production well and the lower portion of the oil-containing zone;
    (c) injecting via said injection well into said formation a brine having a specific gravity greater than the specific gravity of said petroleum and continuing the injection of said brine until breakthrough at said production well to form a fluid communication path through the lower portion of said formation intermediate said injection well and said production well and thereafter terminating the injection of said brine;
    (d) injecting a hydrocarbon solvent for said viscous oil via said injection well into said fluid communication path, said solvent having a viscosity not greater than 1/100 the viscosity of the oil contained in the formation under formation conditions, a specific gravity less than the specific gravity of said brine and less than the specific gravity of said petroleum, and producing fluid including oil and solvent from said formation via said production well until the ratio of produced oil to solvent becomes unfavorable;
    (e) thereafter shutting-in said production well;
    (f) continuing to inject a quantity of said hydrocarbon solvent into the fluid communication path via said injection well;
    (g) shutting in said injection well along with the shut-in production well to permit said formation to undergo a soak period for a time sufficient for gravity-driven convection to substantially mix the solvent with the oil in the formation and thereby reduce its viscosity; and (h) thereafter injecting a driving fluid into the formation via said injection well and recovering fluids including oil from said formation via said production well until the fluid being recovered from the production well comprises an unfavorable ratio of produced oil to driving fluid.

10. The method of claim 9 wherein the total amount of solvent injected during steps (d) and (f) is between 0.05 and 0.30 pore volume and the soaking period during step (g) is for a period of time between 2 and 20 days per vertical thickness in feet of the oil-containing formation.

11. The method of claim 9 wherein said fluid communication means in the injection well and said production well is established between the surface and in communication with the bottom 10 percent of the oil-containing zone.

12. The method of claim 9 wherein the driving fluid is a gaseous material selected from the group consisting of carbon dioxide, nitrogen or aliphatic hydrocarbons having one to four carbon atoms.

13. The method of claim 9 wherein said hydrocarbon solvent is selected from the group consisting of a light crude oil having an API gravity greater than 30 API degrees and a light crude oil product generally known as syncrude.

14. The method of claim 9 comprising the additional step prior to step (h) of establishing fluid communication in the injection well and the production well substantially thoughout the full thickness of the oil-containing formation.

15. The method of claim 9 wherein the driving fluid injected during step (h) is injected into the fluid communication path between the injection well and the production well.

16. A method of recovering viscous oil from a subsurface formation that contains a viscous oil portion and a mobile brine portion immediately therebelow, said formation having no significant permeability barriers therein, and penetrated by at least one injection well and a production well comprising:

(a) injecting a hydrocarbon solvent into said formation near the oil-water interface via said injection well, said solvent having a viscosity not greater than 1/100 the viscosity of the oil contained in the formation under formation conditions, a specific gravity less than said oil contained in the formation and a specific gravity less than said brine and recovering fluids including oil and solvent from said formation near the oil-water interface via said production well until the ratio of oil to hydrocarbon solvent is unfavorable;

(b) thereafter shutting-in said production well;

(c) continuing to inject a quantity of said solvent into the formation near the oil-water interface via said injection well;

(d) shutting in said injection well along with the shut-in production well to permit said formation to undergo a soak period for a time sufficient for gravity-driven convection to substantially mix the solvent with the oil in the formation and thereby reduce its viscosity; and (e) thereafter injecting a driving fluid into the formation via said injection well and recovering fluids including oil from said formation via said production well until the fluid being recovered from the production well comprises an unfavorable ratio of produced oil to driving fluid.

17. The method of claim 16 wherein the total amount of solvent injected during steps (a) and (c) is between 0.05 and 0.30 pore volume and the soaking period during step (d) is for a period of time between 2 and 20 days per vertical thickness in feet of the oil-containing formation.

18. The method of claim 16 wherein the driving fluid is a gaseous material selected from the group consisting of carbon dioxide, nitrogen or aliphatic hydrocarbons having one to four carbon atoms.

19. The method of claim 16 wherein the driving fluid is water.

20. The method of claim 16 wherein said hydrocarbon solvent is selected from the group consisting of a light crude oil having an API gravity greater than 30 API degrees and a light crude oil product generally known as syncrude.

21. The method of claim 16 comprising the additional step prior to step (e) of establishing fluid communication in the injection well and the production well substantially throughout the full thickness of the oil-containing formation.

22. The method of claim 16 wherein the driving fluid injected during step (e) is injected into the formation near the oil-water interface.

23. A method of recovering viscous oil from a subsurface formation that contains a viscous oil portion and a mobile brine portion immediately therebelow, said formation having no significant permeability barrier therein, said formation being penetrated by at least one injection well and one production well, said injection well and production well being in fluid communication with the oil-water interface of the formation, comprising:

(a) injecting a hydrocarbon solvent into said injection well, said solvent having a viscosity not greater than 1/100 the viscosity of the oil contained in the formation under formation conditions, a specific gravity less than the oil contained in the formation, and a specific gravity less than said brine and recovering fluids including solvent and oil from the production well until the fluid being recovered comprises an unfavorable ratio of oil to solvent;

(b) thereafter shutting-in said production well;

(c) continuing to inject a quantity of said hydrocarbon solvent into the injection well;

(d) shutting in said injection well along with the shut-in production well to permit said formation to undergo a soak period for a time sufficient for gravity-driven convection to substantially mix the solvent with the oil in the formation and thereby reduce its viscosity; and (e) thereafter injecting a driving fluid into the injection well and recovering fluids including oil from said formation via said production well until the fluid being recovered from the production well comprises an unfavorable ratio of produced oil to driving fluid.

24. The method of claim 23 wherein the total amount of solvent injected during steps (a) and (c) is between 0.05 and 0.30 pore volume and the soaking period during step (d) is for a period of time between 2 and 20 days per vertical thickness in feet of the oil-containing formation.

25. The method of claim 23 wherein the driving fluid is a gaseous material selected from the group consisting of carbon dioxide, nitrogen or aliphatic hydrocarbons having one to four carbon atoms.

26. The method of claim 23 the driving fluid is water.

27. The method of claim 23 wherein said hydrocarbon solvent is selected from the group consisting of a light crude oil having an API gravity greater than 30 API degrees and a light crude oil product generally known as syncrude.

* * * * *